United States Patent Office 3,293,234
Patented Dec. 20, 1966

3,293,234
RECOVERY OF POLYOLEFINS
James V. Cavender, Jr., Texas City, Tex., assignor to Monsanto Company, a corporation of Delaware
No Drawing. Filed June 14, 1963, Ser. No. 287,781
11 Claims. (Cl. 260—94.9)

This invention relates to the polymerization of olefins and to an improved method for separating olefin polymers from mixtures produced by the polymerization of olefins in the presence of so-called Ziegler catalysts. More particularly, it relates to a method for removing the greater part of the catalyst residues from such polymers to obtain products having improved characteristics with respect to discoloration and degradation.

There has recently come into commercial prominence a process whereby ethylene and other polymerizable hydrocarbons may be polymerized at low temperatures and pressures to yield products of high molecular weight superior in many respects to those produced by the high-pressure techniques previously practiced in the art. This process has been made possible through the agency of a type of catalyst developed by Dr. Karl Ziegler of the Max Planck Institute at Mulheim, Ruhr, Germany, and has come to be commonly termed the "Ziegler process," while the catalysts employed are commonly referred to as "Ziegler catalysts." Many variations of the catalyst have been disclosed but probably the preferred groups are those described in Belgian Patents No. 533,362 and 534,792, the disclosures of which are incorporated herein by reference, namely, catalysts prepared by the interaction of strong reducing agents such as organometallic compounds like metal alkyls with a compound of a metal of Group IV–B, V–B, and VI–B of the periodic table of the elements including thorium and uranium and especially the halides of titanium and zirconium.

As the process as ordinarily conducted, the catalyst is suspended in a suitable liquid organic medium or inert solvent such as hexane, benzene, and the like, and the olefin is bubbled through the system at a temperature anywhere in the range from 0° to 100° C. and at relatively low pressures. Upon completion of the reaction, the polymer is recovered by first destroying the catalyst by contacting or quenching it with an alcohol and then separating the precipitated polymer from the reaction mixture by filtration or centrifugation. After the polymer is removed from the reaction mixture, it is usually washed with a suitable solvent in order to remove final traces of the catalyst residues and the reaction medium. Alkyl alcohols can be used for this purpose. After washing, the polymer is dried by any convenient method.

The olefin polymers obtained have superior and highly desirable properties. Examples of particularly valuable solid polymers produced by the Ziegler process are polyethylene and polypropylene, especially the so-called isotactic or crystalline polypropylene. However, the Ziegler catalysts have the disadvantage of leaving metallic residues intimately admixed with, occluded in, and, perhaps, bonded to the polymer. The presence of these metallic residues tends to impart undesirable characteristics to the polymer. They lead, for example, to degradation and discoloration of the polymer when it is heated or when it is exposed to light, particularly daylight. When subsequently molded, melt fabricated, or otherwise shaped in the presence of heat, the polymers become darker than is desirable and consequently their utility is seriously restricted. While it has been found that antioxidants and like compounds may sometimes be employed to stabilize polymeric products against the effects of degradation induced by exposure to heat and light, the effectiveness of such agents is often greatly reduced or even nullified in the presence of such metallic oxidation catalysts as are found in the catalyst residues remaining in the polymers produced by the Ziegler process. In addition to detrimental color effects arising from molding, the electrical properties, particularly the electrical insulating properties of the molded products, are also adversely affected. Further, the catalyst residues retained in the polymer will cause corrosion of process equipment employed in the fabrication of the polymer. Thus, it will be seen that it is imperative to remove these metal-containing catalyst residues from the polymers.

This need is met generally in the prior art by quenching of the catalyst in the reaction medium with an alcohol. Alcoholysis will cause dissolution of the metal-to-polymer bond and effect solvolysis of the metal. However, in the usual alcohol treatment only the dissolved fraction or the solid particles of the catalyst residue which are soluble in the alcohol are affected. Thus, while this technique is ordinarily effective, it is not completely satisfactory when certain aluminum/titanium ratios and reaction conditions are employed for producing polymers having specific bulk densities and desirable density ranges. The need for further improvements in the purification of olefin polymers to remove remaining residues of the metallic catalysts in order to improve the quality of the resulting product is, therefore, obvious. Various aftertreatments of the polymer have been proposed for this purpose also but the employment of an agent which can be incorporated in the quenching step wherein the bulk of the catalyst is destroyed has obvious advantages over these.

Now, in accordance with the present invention, it has been found that metallic catalyst residues obtained in the Ziegler polymerization of olefins can be effectively reduced and the color stability of the polymer greatly improved by a process which comprises contacting the catalyst in the reaction mixture after the polymerization has taken place and before any substantial removal of the polymer from the reaction mixture with an alkyl alcohol and a minor amount of ferric ammonium sulfate ($FeNH_4(SO_4)_2 \cdot 12H_2O$). Polymers produced by this process are less subject to deterioration and discoloration during shaping and forming operations than those produced using conventional quenching techniques.

Any alkyl alcohol containing from 1 to 8 carbon atoms can be used. Of the suitable alcohols, methyl alcohol, ethyl alcohol, propyl alcohol, isopropyl alcohol, n-butyl alcohol, tert-butyl alcohol, isobutyl alcohol, amyl alcohol, hexyl alcohol, octyl alcohol, and the like, methyl alcohol is the preferred quenching agent. The amount of alcohol used for quenching is not critical and may be varied widely from about 1% to about 300% of the weight of the polymer slurry being treated. Generally, amounts from about 5% to about 25% by weight of the polymer slurry are satisfactory but the amount can be controlled as desired to provide an amount of alcohol sufficient to form a slurry of satisfactory fluidity.

The amount of ferric ammonium sulfate employed with the alcohol depends to some extent upon the catalyst employed, catalyst concentration, the desired purity of the polymer, and the like. Usually, the amount used is related to the amount of the Group IV–B, V–B, or VI–B metal in the reaction mixture or polymer slurry and varies from about 0.5 mole to about 6.0 moles of ferric ammonium sulfate per mole of said metal. Preferably, an amount from about 2.0 to about 4.0 moles of the additive per mole of said metal is employed.

The quenching reaction may be conducted at temperatures in the range from about 80° to about 100° C. but temperatures from about 90° to 100° C. are preferred. The time of treatment can also be varied. As short a period of time as 10 minutes is beneficial and one hour is adequate in most instances although it may be practical on some occasions to allow the quenching action to continue for several hours. Preferred quenching times are those from about 30 minutes to about 60 minutes. Air and water are excluded during the quenching and recovery operations and an inert atmosphere is ordinarily maintained during these process steps.

The invention is illustrated in the following example which, however, is not to be construed as limiting it in any manner whatsoever.

*Example*

A series of runs was conducted in which ethylene was polymerized as follows: High purity commercial n-hexane was dried and deoxygenated for use as a polymerization medium. High purity ethylene was dried over molecular sieves to obtain monomer with less than 4 p.p.m. $H_2O$. The polymerization catalyst comprising titanium tetrachloride and diisobutylaluminum hydride was prepared by mixing or complexing the catalyst ingredients in hexane. The concentration of titanium tetrachloride in the complex was about 2.0 millimoles per liter while the aluminum-titanium molar ratio was approximately 1.2. Hexane and complexed catalyst were charged to a polymerization vessel equipped with an agitator and heated to a temperature of about 65° C. Ethylene together with a small amount of hydrogen for molecular weight control was admitted to the polymerization vessel and the polymerization was conducted at 90° C. and a maximum pressure of 100 p.s.i.g. for a period of about two hours. At the end of the polymerization reaction, the polymer was in the form of a slurry (containing about 17–18% solids) in the hexane diluent.

Samples of the reaction slurries (approx. 1500 ml.) were quenched by adding either methanol alone or methanol having dissolved therein a small amount of ferric ammonium sulfate and heating the resultant mixtures at a temperature of about 98° C. for about 30 minutes. The amount of methanol employed in each case was about 15% by weight of the polymer slurry. Thereafter, the mixture was cooled to room temperature and filtered. The polyethylene precipitate was washed three times with dry methanol and dried under vacuum at a temperature of about 65–70° C.

The polyethylene samples thus obtained in the form of finely divided white powders were densified and compression-molded test pieces for color evaluation were prepared from them at 250° C. using a maximum pressure of 20 tons per square inch. The color of the pieces (0.125 in. thickness) was determined by standard spectrophotometric means which measures degree of yellowness. Reflectance (R) of the test pieces at wavelengths of 700 millimicrons, 500 millimicrons and 433 millimicrons was measured and a numerical value, $Y_3$, calculated according to the formula $$Y_3 = 2R_{700} - (R_{500} + R_{433})$$

was obtained to provide for comparative evaluation. The lower the value obtained the "whiter" or less colored is the polymer. Greyness values, i.e., the reflectance measured at a wavelength of 560 millimicrons, were also obtained for each test piece. In this case, the higher values signify "whiter" or less colored polymer. Catalyst residues in the polymer samples were determined by X-ray fluorescence analysis. Results of the color evaluations obtained and residue values together with the treating agent to which the polymers were subjected are presented in Table I.

TABLE I

| Quenching Agent | Color | | Residues (p.p.m.) | | | |
|---|---|---|---|---|---|---|
| | $Y_3$ | Greyness | Al | Ti | Fe | Cl |
| Methanol | 18 | 78 | 123 | 15 | 2 | 82 |
| Methanol | 23 | 80.5 | 97 | 28 | 1 | 24 |
| Methanol + $FeNH_4(SO_4)_2$ (2 mol/mol Ti) | 8.5 | 87 | <1 | 13 | 1 | <1 |
| Methanol + $FeNH_4(SO_4)_2$ (4 mol/mol Ti) | 6 | 87 | 14 | 26 | 1 | <1 |

These data demonstrate that quenching of the catalyst in a Ziegler polymerization with an alcohol to which has been added a small amount of ferric ammonium sulfate reduces catalyst residues in the polymer more effectively than does the conventional method of quenching with alcohol alone. Also, the polymer produced when this additive is used in the quenching step as evidenced by the color values obtained for the molded test pieces is superior with respect to color.

The process of the present invention is applicable in the polymerization of any olefin. It can be employed with any ethylenically unsaturated hydrocarbon or mixtures thereof which can be polymerized with Ziegler catalysts to produce homopolymers or interpolymers, respectively. Exemplary of such materials in addition to propylene and ethylene are butene-1, heptene-1, octadecene-1, dodecene-1, 3-methylbutene, 4-methylbutene, styrene, vinyl cyclohexene, and the like. Diolefins particularly suitable for intrepolymerization include butadiene, isoprene, piperylene, cyclopentadiene, 1,4-pentadiene, and the like.

The process of the invention is not limited to any specific Ziegler catalyst but is applicable in the production of polymers made with any Ziegler catalyst. As mentioned previously, the Ziegler catalysts used for polymerization of olefins are those comprising the product formed from the reaction of a compound of a transition metal selected from Group IV–B, V–B, or VI–B of the periodic table of the elements with a metallic reducing agent. Preferably, the transition metal compounds employed are the compounds of titanium and zirconium with the halides being especially preferred although oxyhalides, organic salts or complexes of these elements can be used. The titanium or zirconium in the compounds employed should be in a valence form higher than the lowest possible valence. The tetrahalides are especially preferred although the dihalides, trihalides, mixtures of di-, tri-, and tetrahalides, etc., can be used. Titanium or zirconium compounds other than halides which can be employed include alcoholates, alkoxides or esters such as titanium tetramethoxide (also called tetramethyltitanate), titanium triethoxide, tripropoxytitanium chloride, zirconium tetra-n-butoxide, or complexes such as zirconium acetylactonate, $K_2TiF_6$, or salts of organic acids such as the acetates, bezoates, etc., titanium and zirconium.

Preferred as metallic reducing agents are organoaluminum compounds such as triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, diisobutylaluminum chloride, diisobutylaluminum hydride, diethylaluminum chloride, and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylaluminum sesquihalides, are also suitable. In addition to the organoaluminum compounds, organometallic compounds of magnesium or zinc can be used. Also suitable are other reducing agents such as alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters, and the like.

The quantities of catalytic components can be varied considerably. The mole ratio of reducing agent to transition metal compound can be in the range from 0.3:1 to 10:1, on up to 15:1 or even higher. With an organoaluminum compound and a titanium halide the preferred Al:Ti mole ratios are those between 1:3 and 5:1.

The amount of catalyst required is comparatively small. Generally, amounts from 0.1 to 5.0% by weight based on the total weight of monomer charged are satisfactory although amounts as small as 0.01% are sometimes permissible and larger amounts up to, say 20% can be employed.

While the example herein includes the use of hydrogen in the polymerization system to control the molecular weight of the polymer, the process is not to be considered as limited to this modification. The improved quenching technique of the present invention is applicable in the Ziegler processes for polymerizing olefins wherein no modifier at all is employed for molecular weight control or wherein other modifiers known to the art such as acetylene, hydrogen chloride, oxygen, and the like are employed for this purpose.

What is claimed is:

1. In a process for the production of polyolefins by polymerization of an olefin in the presence of a catalytic amount of a catalyst prepared by the interaction of a strong reducing agent with a compound of a metal selected from the metals of Group IV–B, V–B, and VI–B of the periodic table of the elements, said catalyst being suspended in an inert hydrocarbon diluent, the improvement for the recovery of polyolefins having reduced catalyst residues which comprises quenching the catalyst after the polymerization has taken place and before any subsequent removal of the polymer from the reaction mixture by adding to said reaction mixture an alkyl alcohol containing from 1 to 8 carbon atoms and a minor amount of ferric ammonium sulfate and recovering the polyolefin from the resulting mixture.

2. The process of claim 1 wherein said quenching is effected at a temperature from about 80° to about 100° C.

3. The process of claim 2 wherein said alkyl alcohol is methanol.

4. The process of claim 3 wherein the amount of ferric ammonium sulfate is in the range from about 0.5 mole to about 6 moles per mole of said metal selected from the metals of Group IV–B, V–B and VI–B of the periodic table in said reaction mixture.

5. The process of claim 4 wherein said quenching is effected over a period from about 30 to about 60 minutes.

6. In a process for the production of polyolefins by polymerization of an olefin in the presence of a catalytic amount of a catalyst comprising a titanium halide and an organoaluminum compound, said catalyst being suspended in an inert hydrocarbon diluent, the improvement providing for recovery of a polyolefin having reduced catalyst residues which comprises quenching the catalyst after polymerization has taken place and before any subseqeunt removal of the polyolefin from the reaction mixture by adding to said reaction mixture an alkyl alcohol containing from 1 to 8 carbon atoms and a minor amount of ferric ammonium sulfate and recovering the polyolefin from the resulting mixture.

7. The process of claim 6 wherein said quenching is effected at a temperature from about 90 to about 100° C.

8. The process of claim 7 wherein said alkyl alcohol is methanol.

9. The process of claim 8 wherein the amount of ferric ammonium sulfate is in the range from about 0.5 mole to about 6 moles per mole of titanium in said reaction mixture.

10. The process of claim 9 wherein said quenching is effected over a period from about 30 to about 60 minutes.

11. In a process for the production of polyethylene by polymerization of ethylene in the presence of a catalytic amount of a catalyst comprising titanium tetrachloride and diisobutylaluminum hydride, said catalyst being suspended in n-hexane, the improvement providing for recovery of polyethylene having reduced catalyst residues which comprises quenching the catalyst after polymerization has taken place and before any subsequent removal of the polymer from the reaction mixture by heating said reaction mixture with methanol and from about 2 to about 4 moles of ferric ammonium sulfate per mole of titanium in said reaction mixture at a temperature in the range from about 90° to about 100° C. for a period of time from about 30 to about 60 minutes and recovering polyethylene from the resulting mixture.

No references cited.

JOSEPH L. SCHOFER, *Primary Examiner.*

L. EDELMAN, *Assistant Examiner.*